US008605726B2

(12) United States Patent
Grosser, Jr. et al.

(10) Patent No.: US 8,605,726 B2
(45) Date of Patent: Dec. 10, 2013

(54) METHODS, SYSTEMS, AND COMPUTER READABLE MEDIA FOR NEXT HOP SCALING WITH LINK AGGREGATION

(75) Inventors: Donald B. Grosser, Jr., Apex, NC (US); Edward J. Rovner, Chapel Hill, NC (US)

(73) Assignee: Extreme Networks, Inc., Santa Clara, CA (US)

( * ) Notice: Subject to any disclaimer, the term of this patent is extended or adjusted under 35 U.S.C. 154(b) by 119 days.

(21) Appl. No.: 12/972,391

(22) Filed: Dec. 17, 2010

(65) Prior Publication Data

US 2012/0127999 A1 May 24, 2012

Related U.S. Application Data

(60) Provisional application No. 61/415,643, filed on Nov. 19, 2010.

(51) Int. Cl.
*H04L 12/28* (2006.01)

(52) U.S. Cl.
USPC .......................................... 370/392

(58) Field of Classification Search
USPC .................. 370/359, 392, 396, 401
See application file for complete search history.

(56) References Cited

U.S. PATENT DOCUMENTS

| | | | |
|---|---|---|---|
| 6,192,051 B1 * | 2/2001 | Lipman et al. | 370/389 |
| 2007/0268915 A1 | 11/2007 | Zelig et al. | |
| 2008/0240133 A1 | 10/2008 | Tanaka | |
| 2010/0128729 A1 | 5/2010 | Yazaki et al. | |
| 2010/0272107 A1 | 10/2010 | Papp et al. | |
| 2011/0069706 A1 * | 3/2011 | Sen et al. | 370/392 |
| 2012/0127996 A1 | 5/2012 | Grosser et al. | |

FOREIGN PATENT DOCUMENTS

WO   WO 2012/068579 A2   5/2012

OTHER PUBLICATIONS

Notification of Transmittal of the International Search Report and the Written Opinion of the International Searching Authority, or the Declaration for International Patent Application No. PCT/US2011/061690 (Jul. 31, 2012).
Notification Concerning Availability of the Publication of the International Application for International Patent Application No. PCT/US2011/061690 (May 24, 2012).
Commonly-assigned, co-pending U.S. Appl. No. 12/950,587 for "Methods, Systems, and Computer Readable Media for Next Hop Scaling," (Unpublished, filed Nov. 19, 2010).
"BCM56510 Product Brief," Broadcom®, pp. 1-2 (Jun. 13, 2006).
Non-Final Office Action for U.S. Appl. No. 12/950,587 (Mar. 25, 2013).
"Statement of Donald B. Grosser, Jr. and Edward J. Rovner Regarding Extreme Networks Prior Extreme Networks Packet Forwarding Lookup Architecture," pp. 1-3 (Jul. 25, 2013).

* cited by examiner

*Primary Examiner* — Dang Ton
*Assistant Examiner* — Nourali Mansoury
(74) *Attorney, Agent, or Firm* — Jenkins, Wilson, Taylor & Hunt, P.A.

(57) ABSTRACT

The subject matter described herein includes methods, systems, and computer readable media for next hop scaling with link aggregation. According to one aspect of the subject matter described herein, a system for next hop scaling is provided. The system includes a packet forwarding device including a plurality of packet processors for performing next hop and link aggregation group (LAG) selection operations. Within this plurality of packet processors, ingress packet processors are configured to indicate, for received packets that have a next hop on a different packet processor, that an egress next hop selection operation is needed. Egress packet processors of the plurality of packet processors are configured to perform the egress next hop and member selection operations for the packets for which an egress next hop selection operation is indicated, wherein forwarding of the packets is limited to active LAG group members local to the egress packet processor.

20 Claims, 4 Drawing Sheets

METHODS, SYSTEMS, AND COMPUTER READABLE MEDIA FOR NEXT HOP SCALING WITH LINK AGGREGATION

PRIORITY CLAIM

This application claims the benefit of U.S. Provisional Patent Application Ser. No. 61/415,643, filed Nov. 19, 2010, the disclosure of which is incorporated herein by reference in its entirety.

TECHNICAL FIELD

The subject matter described herein relates to packet forwarding devices. More particularly, the subject matter described herein relates to packet forwarding devices with improved next hop scaling with link aggregation.

BACKGROUND

Address resolution protocol (ARP) is the protocol by which bindings between IP addresses and MAC addresses are communicated between devices. When a device needs to send an IP packet to another device, the sending device must first determine the MAC address corresponding to IP address of the next hop (next machine in the path to the destination or the destination itself, if the next machine is the destination). The sending device can use ARP to determine the next hop MAC address. The sending machine broadcasts an ARP request with the next hop IP address to all machines within a particular domain, and the machine whose IP address is contained in the ARP request responds with the machine's MAC address. Once the sending machine obtains the next hop MAC address, the sending machine stores the binding between the IP address and the MAC address in memory so that the binding can be used for forwarding subsequent packets to the same machine.

In some packet forwarding architectures, the lookup used to determine the next hop information for a received packet is performed solely by the ingress packet processor, i.e., the packet processor associated with the port of a packet forwarding device on which the packet is received. The ingress packet processor performs a layer 3 route lookup based on the IP address in the received packet to identify not only the destination port in the packet forwarding device for the packet, but also the destination MAC address for the packet. Using such an ingress lookup architecture designed for full-mesh traffic, because a packet destined for a particular host may arrive on any port of the packet forwarding device, the memory associated with each packet processor must store a complete set of ARP bindings for all of the hosts connected to the packet forwarding device.

Because the memory accessible by each packet processor is typically limited, the number of hosts that can be connected to a packet forwarding device can be limited by the memory available to a single packet processor, which greatly limits the scalability of the packet forwarding device. For example, in a packet forwarding architecture where each packet processor has a fixed amount of memory for storing ARP bindings, the maximum number of ARP table entries is limited by the amount of memory of a single packet processor, because each packet processor must store the same complete set of ARP bindings. Stated differently, the requirement that each packet processor store the same complete set of ARP bindings reduces the scalability of the system by a factor of 1/(# of packet processors). Adding packet processors does not increase the number of hosts that the packet forwarding device can serve once the maximum number of ARP table entries, which is limited by the ARP binding storage space available to a single packet processor, is reached. Such a limitation is undesirable, especially when there is a need for the packet forwarding device to serve large numbers of connected hosts.

One particular network configuration for which it is desirable to have a packet forwarding device serve large numbers of connected hosts occurs when virtualization is used. In a virtualization environment, a single physical host may be configured with many virtual hosts. Each virtual host has its own separate operating system, network address, and MAC address. Each virtual host would require an ARP binding in a packet forwarding device. Thus, connecting many physical hosts to the packet forwarding device, where each of the physical hosts includes plural virtual hosts further increases the need for scalable packet forwarding device architectures.

Accordingly, in light of these difficulties, there exists a need for methods, systems, and computer readable media for next hop scaling. In addition, however, although improved next hop scaling could help customers with large data centers using server virtualization or large layer 2 forwarding domains, those same customers often also heavily depend on link aggregation (also known as port load sharing) for resilience and load balancing. A link aggregation group (LAG) may consist of a plurality of physical ports that behave as a group. Customers have two expectations for LAG behavior that must be addressed within any distributed IP next hop scaling method that may be developed: (1) Packets to a particular MAC address (and network address) from multiple sources (or to multiple addressees from a single source) may utilize all active ports in a LAG for load balancing; and (2) The network adapts quickly when a port in the LAG goes down or up, to achieve expectation (1).

Accordingly, for any methods and systems for next hop scaling that are developed, it can be desirable that such developments do not impede the ability of such methods and systems to incorporate link aggregation.

SUMMARY

The subject matter described herein includes methods, systems, and computer readable media for next hop scaling with link aggregation. According to one aspect of the subject matter described herein, a system for next hop scaling is provided. The system includes a packet forwarding device including a plurality of packet processors for performing next hop and link aggregation group (LAG) selection operations. Within this plurality of packet processors, ingress packet processors are configured to perform the next hop and LAG member selection operations for packets that arrive from external ports of the packet forwarding device. The ingress packet processors are further configured to indicate, for received packets that have a next hop on a different packet processor, that an egress next hop selection operation is needed. Egress packet processors of the plurality of packet processors are configured to perform the egress next hop and member selection operations for the packets for which an egress next hop selection operation is indicated, wherein forwarding of the packets is limited to active LAG group members local to the egress packet processor.

The subject matter described herein for next hop scaling with link aggregation can be implemented using a non-transitory computer readable medium having stored thereon executable instructions that when executed by the processor of a computer control the computer to perform steps. Exemplary computer readable media for implementing the subject matter described herein may include chip memory devices, disk memory devices, programmable logical devices, and application specific integrated circuits. In addition, a computer readable medium that implements the subject matter described herein may be located on a single device or computing platform or may be distributed across plural devices or computing platforms.

BRIEF DESCRIPTION OF THE DRAWINGS

Preferred embodiments of the subject matter described herein will now be described with reference to the accompanying drawings of which.

DETAILED DESCRIPTION

Figure 1:
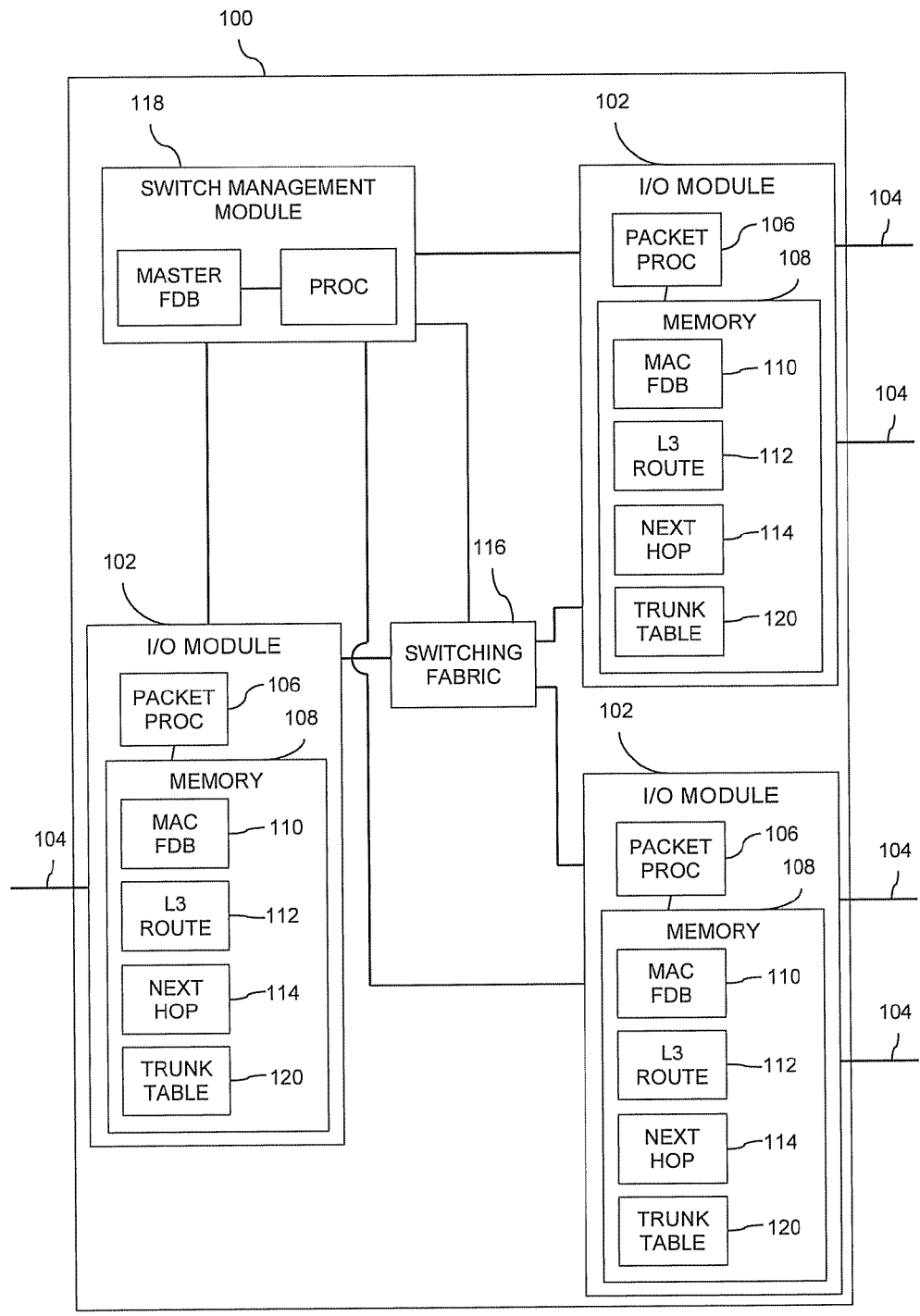
FIG. 1 is a block diagram of a packet forwarding device according to an embodiment of the subject matter described herein.

The subject matter described herein includes methods, systems, and computer readable media for next hop scaling with link aggregation. FIG. 1 is a block diagram illustrating an exemplary packet forwarding device for implementing next hop scaling with link aggregation according to an embodiment of the subject matter described herein. Referring to FIG. 1, packet forwarding device 100 may have layer 2 switching and layer 3 packet forwarding capabilities, where layers 2 and 3 refer to the corresponding layers in the OSI protocol stack. Packet forwarding device 100 includes a plurality of input/output (I/O) modules 102, each having at least one port 104 for communicating packets to and receiving packets from connected hosts, such as servers, personal computers, routers, etc. Each I/O module 102 includes a packet processor 106 and memory 108. Each packet processor 106 performs packet forwarding operations using packet forwarding information stored in its respective memory 108. In the illustrated example, each memory 108 includes a MAC forwarding database 110 for storing layer 2 packet forwarding information, a layer 3 longest prefix match or host route table 112 for storing layer 3 packet forwarding information, a next hop table 114 for storing egress port, MAC address, and VLAN information, and a trunk table 120 for storing LAG information, including egress slot and port information for LAG groups.

The combination of layer 3 route table 112 and next hop table 114 stores next hop bindings (e.g., ARP bindings). For example, a lookup is performed in layer 3 route table 112 to determine a next hop identifier or index corresponding to the destination IP address in a received packet. The next hop identifier or index is used to perform a lookup in next hop table 114, which can store the MAC address and VLAN information corresponding to the destination IP address. Alternatively, if the destination IP address is connected to a LAG, the lookup in next hop table 114 can result in an index to trunk table 120. Trunk table 120 includes entries corresponding to a LAG group, where an entry corresponding to a LAG group includes egress slot and port information for LAG group members. Each packet processor 106 may select among LAG group members using a hash algorithm based on packet parameter values and may forward the packet to the packet processor associated with the egress slot and port. Because of the use of distributed ARP scaling, however, a packet forwarding lookup may also be performed by the egress packet processor, and the hash algorithm of the egress packet process to select among LAG group members may not be identical to the hash algorithm on the ingress packet processor, a boomerang effect may occur where the packet is forwarded among multiple packet processors. As will be described in more detail below, the subject matter described herein avoids such a boomerang effect when selecting among LAG group members, even when ingress and egress packet forwarding lookups for distributed ARP scaling are performed.

In addition to I/O modules 102, packet forwarding device 100 includes a switch fabric 116 that is responsible for forwarding packets between I/O modules 102 and between I/O modules 102 and switch management module 118. Switch management module 118 controls the overall operation of packet forwarding device 100. In addition, switch management module 118 may participate in IP routing protocols to populate layer 3 route tables 110 and may perform slowpath forwarding lookups for packets for which entries are not populated in layer 3 route tables 112.

Distributed ARP Scaling

Using distributed ARP scaling, the ARP bindings may be distributed across packet processors so that ARP bindings for hosts are stored only in the next hop tables of the packet processors to which the hosts are connected. Entries in a packet processor's next hop table for other hosts that are not connected to the packet processor can be indicated as relay entries in the next hop table used by the packet processor. If a packet received from an external port by a packet processor (hereinafter, the ingress packet processor) results in a match to a relay entry in the next hop table, the packet will be forwarded unmodified to the packet processor associated with the egress port (hereinafter, the egress packet processor). The egress packet processor will perform a lookup in its L3 route table and next hop table, determine the MAC address for the packet, replace the MAC address in the packet, and forward the packet from packet forwarding device 100.

For instance, next hop tables 114 on different I/O modules 102 can be configured to contain different next hop information. For example, a given next hop table 114 can store a MAC address for a host that is connected to the packet processor associated with that next hop table 114 but does not contain MAC addresses for hosts connected to other packet processors. Rather, the selected next hop table 114 contains relay entries for hosts connected to other packet processors, with the destination port identifying a "hybrid" port on the egress I/O module that was a previously unused port. The hybrid port may be any port that is not used for packet forwarding.

When the egress packet processor receives a packet that has been relayed by an ingress packet processor, the packet will include a fabric header that indicates the destination port. The fabric header is inserted on the packet by the ingress packet processor so that the switch fabric will be able to direct the packet to the correct egress packet processor. If the fabric header egress port parameter indicates a hybrid port, such a parameter will trigger the egress packet processor to perform a lookup in its L3 route table and next hop table to determine the MAC address for the packet and the egress port for the packet. The egress packet processor will then replace the MAC address in the packet and forward the packet from packet forwarding device 100.

It should be noted that the next hop table associated with each packet processor is required to store only a single relay entry for each additional packet processor in the system, regardless of number of hosts connected to the other packet processors, which greatly reduces the amount of data that must be stored by each packet processor for hosts connected to other packet processors. It should also be noted that L3 route tables 112 associated with each packet processor differ from each other to account for the differences in the corresponding next hop tables. An exemplary configuration for packet forwarding device 100 having such a distributed arrangement of ARP bindings is disclosed in U.S. patent application Ser. No. 12/950,587, filed Nov. 19, 2010, the disclosure of which is incorporated by reference herein in its entirety.

Because packet forwarding device 100 can be configured to include distributed storage of ARP bindings, rather than being limited to the storage available by a single packet processor for storing ARP bindings, the number of hosts to which packet forwarding device 100 can be connected is limited by the total of the memory available for ARP bindings across all of the packet processors. Thus, in contrast to typical configurations, such a configuration can provide a substantial increase in scalability. In addition, because each packet processor is responsible for full ARP bindings for directly connected hosts, the number of hosts that can be served by packet forwarding device 100 is scalable with the number of packet processors. As a result, the connectivity of packet forwarding device 100 can be increased by adding additional packet processors.

Thus, using distributed storage of ARP bindings combined with relay entries on egress packet processors and egress next hop lookups, improved ARP scaling is achieved. A packet forwarding device with ARP scaling as described herein can be used to greatly increase the number of physical and/or virtual hosts that can be served by the packet forwarding device. For example, because the storage of next hop bindings is distributed across the packet processors, the number of hosts that can be served is limited by the total memory storage space across all of the packet processors, rather than being limited to the memory storage of a single packet processor. For example, if a given packet forwarding device has four packet processors, the packet forwarding device can accommodate a distributed next hop table with a number of entries that can be stored in the combined storage space of the four packet processors. The total number of next hop entries that can be stored would not be exactly equal to four times that of one of the packet processors, as the relay entries occupy some space on the ingress packet processors. In addition, hosts may not be evenly distributed among the packet processors. The subject matter described herein thus makes the packet forwarding device more scalable, as adding additional packet processors allows more hosts to be served with a decreased likelihood of reaching the maximum number of next hop table entries.

Distributed ARP Scaling with LAG

Figure 2:
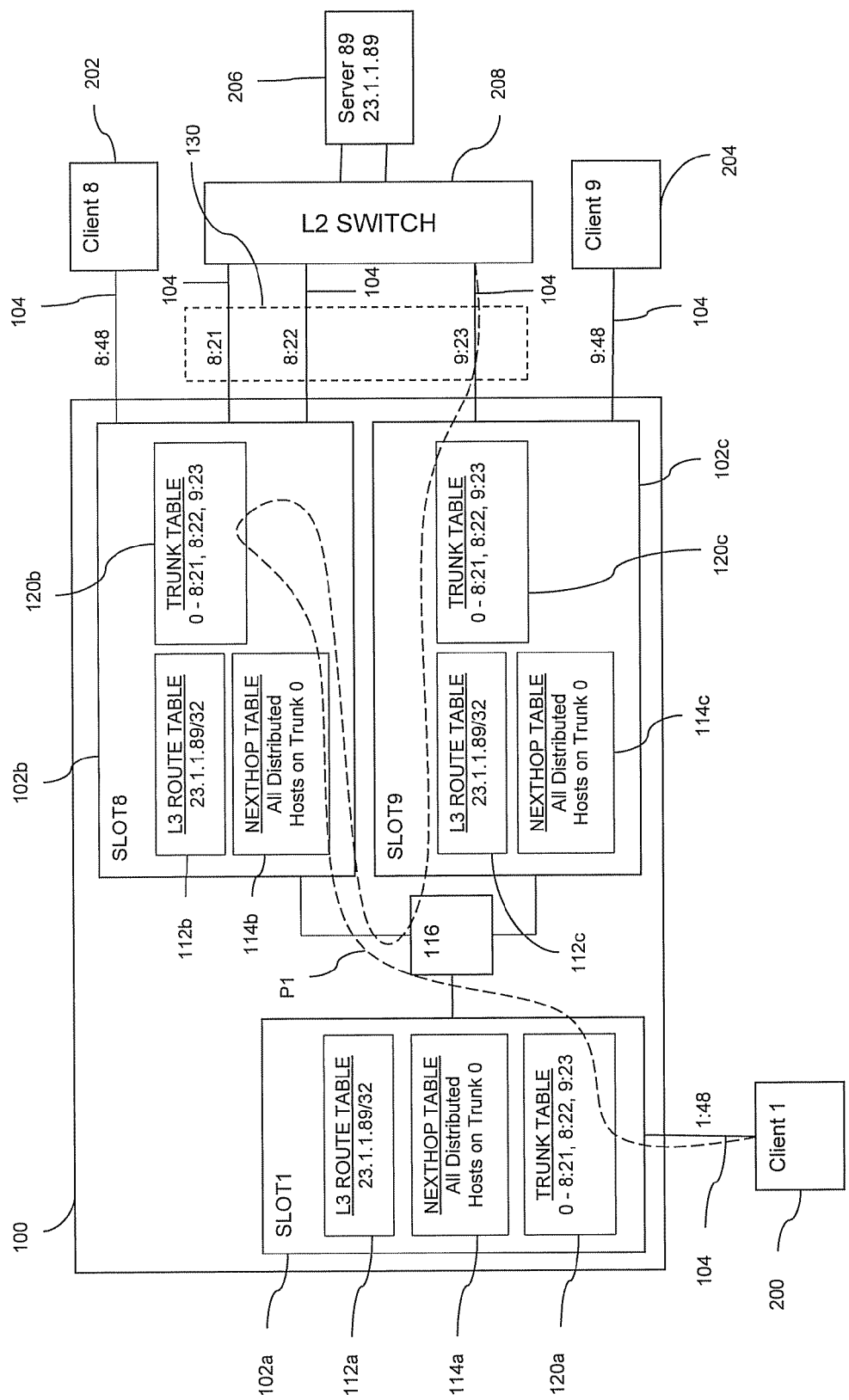
FIG. 2 is a block diagram illustrating tables in a packet forwarding device without modified link aggregation.

As noted above, however, it would be further desirable to incorporate such improved ARP scaling into a system that also provides link aggregation for resilience and load balancing. Adding link aggregation can mean that even if a packet received from an external port by a packet processor results in a match to a relay entry in the next hop table, if the relay entry is associated with a LAG, a LAG member selection operation must still be performed. FIG. 2 is a more detailed diagram of packet forwarding device 100 showing exemplary configurations of layer 3 route table 112, next hop table 114, and trunk table 120 for use in a link aggregation configuration. The remaining components illustrated in FIG. 1 are omitted from FIG. 2 for simplicity. In FIG. 2, I/O modules 102 are associated with different card slots in packet forwarding device 100. In the illustrated configuration, a single I/O module is associated with slot1, a single I/O module is associated with slot8, and a single I/O module is associated with slot9. It is also assumed for purposes of this example, that each I/O module includes a single packet processor. However, using plural packet processors per I/O module and/or slot is intended to be within the scope of the subject matter described herein.

In the illustrated example, each port 104 has an associated port number and a slot number. For example, 1:48 indicates slot1, port48, 8:21 indicates slot8, port21, etc. Slot1:port48 is connected to a host 200, slot8:port1 is connected to a host 202, and slot9:port48 is connected to a host 204. Similarly, the remaining ports of packet forwarding device 100 are together connected as a LAG 130 to a host 206 with the IP address/MAC address combinations shown in FIG. 2. Specifically, slot8:port21, slot8:port22, and slot9:port23 are each connected to host 206 via a L2 switch 208. Hosts 200, 202, 204, and 206 can be physical devices or a combination of physical and virtual devices. For example, hosts 200, 202, 204, and 206 may be servers, client computers, routers, etc., with or without virtualization software.

As shown in FIG. 2, LAG member selection is accomplished by referring all next hops intended for a host associated with LAG 130 (e.g., host 206 in FIG. 2) to an entry of a trunk table 120 on each of I/O modules 102. Specifically, for example, entry 0 of each trunk table 120 contains a list of each port 104 that is a member of LAG 130. It should be noted that the entries in trunk tables 120 associated with each I/O module 102 and packet processor in this configuration are identical, with each trunk table 120 containing entries for all of the ports that are members of LAG 130 connected to packet forwarding device 100, irrespective of the physical ports to which the members are connected.

Without distributed IP ARP scaling, the ingress packet processor uses a hash on packet parameters to select an egress port from among the ports in LAG 130, and no ARP or LAG lookup is performed by the egress packet processor. When distributed ARP scaling is implemented as described above, however, both the ingress packet processor and egress packet processor have a role in forwarding packets. Because there are two separate packet processors involved, using a traditional hash-based LAG decision at both packet processors may present the above-mentioned boomerang problem. As an example, referring to FIG. 2, a packet from host 200 can be intended for transmission to host 206. If standard LAG behavior were employed, the ingress packet processor (packet processor on I/O module 102a on slot1) might hash on a packet and choose the egress port 8:21 on slot8. The egress packet processor (packet processor on I/O module 102b on slot8) then does an L3 lookup to forward the packet and hashes again. If the hash algorithm between packet processors associated with I/O modules 102a and 102b are not identical, this second hash could choose the egress port on yet a different slot, such as port 9:23 on slot9, provided that the new egress port is also part of LAG 130. This "boomerang effect" (illustrated by the dashed line identified as path P1 in FIG. 2) of the packet visiting an intermediate packet processor (e.g., packet processor on I/O module 102b on slot8) before egressing a final processor (e.g., packet processor on I/O module 102c on slot9) over-utilizes switch backplane bandwidth, and is therefore not desirable.

To avoid such an effect, one option can be to pre-program the trunk tables with a unique egress port for each unique IP destination to perform a kind of quasi load balancing. This configuration would avoid the "boomerang effect", but it would not allow for optimal load sharing to one server because all packets from all ports on one ingress packet processor destined to one host would egress the same port every time. Such an approach would also require maintaining a list of hosts associated with each egress port on a LAG, and would thus require potentially tens of thousands of trunk table updates whenever a LAG port goes up or down, or to rebalance the hosts whenever a port is added or deleted on a LAG. This arrangement would not provide quick reaction to LAG changes.

Figure 3:
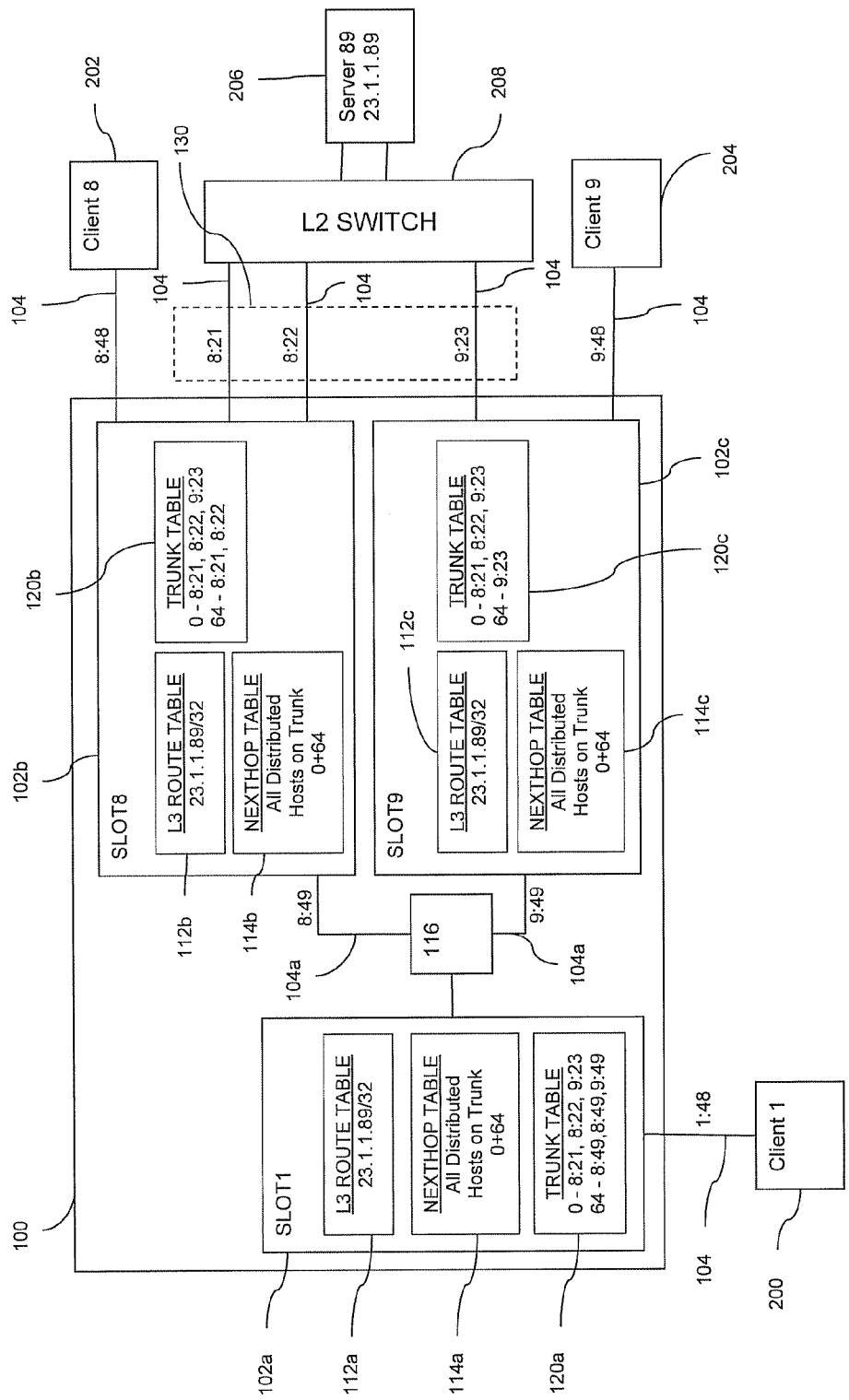
FIG. 3 is a block diagram of a packet forwarding device with modified link aggregation according to an embodiment of the subject matter described herein.

Alternatively, the system can be configured to maintain dual LAG spaces in the trunk tables as shown in FIG. 3. For each LAG group configured by the user with front panel ports, a separate special LAG group can be automatically reserved and maintained. This special LAG group can contain front panel ports 104 or packet processor "hybrid ports" 104a. The special LAG group can be quickly updated whenever updates are made to the front panel LAG group. If no LAG ports are active on the local packet processor, the special LAG can be configured to contain the hybrid port numbers corresponding to each egress port. If some LAG port is active on the local packet processor, however, the special LAG can be configured to contain only the local active front panel port numbers. This configuration halves the maximum number of LAG groups (e.g., from 128 to 64), but fulfills the two customer expectations of load sharing packets to distributed IP ARP entries, and of quickly reacting to changes in the LAG. It is noted that only distributed IP next hop host entries utilize the special LAG groups. Other forwarding database entries, such as layer-2 MAC entries or multicast entries, can use the "normal" LAG groups and are unaffected by this method.

Regarding the specific implementation of the special LAG groups, FIG. 3 illustrates that in addition to each trunk table 120 having a primary entry (e.g., entry 0) containing the members of a given LAG, each trunk table 120 can further have a supplementary entry (e.g., entry 64) associated with the corresponding special LAG. Much like different next hop tables 114 can be different for each I/O module 102, the supplementary entries of each trunk table 120 can be different to reflect differences in which members of a given LAG are preferred egress ports for packets forwarded from a given I/O module 102. In particular, the supplementary entries of each trunk table 120 can list only a preferred subset of the ports that are members of the LAG.

For instance, in the arrangement shown in FIG. 3, packets from host 200 on port 1:48 to host 206 will be distributed across those ports that are members of the LAG (e.g., 8:21, 8:22, and 9:23), as expected. If any of those ports were to go down, packets would be distributed across the remaining active ports. In addition, rather than listing each of the ports precisely, the supplementary entry of trunk table 120 can list the hybrid port numbers corresponding to each of the members of the LAG. For example, because none of the active ports in the LAG are local to host 200, the supplementary entry of trunk table 120a contains only the hybrid port numbers corresponding to the egress ports (e.g., 8:49 and 9:49). In this way, the ingress packet processor needs only to identify an appropriate egress packet processor rather than selecting a precise egress port.

Further, where multiple members of a LAG are contained on a single I/O module, multiple instances of the corresponding hybrid port number can be listed in the supplementary entry of trunk table 120a to maintain an equal distribution of packets forwarded to each member of the LAG. For example, entry 64 of trunk table 120a can contain two instances of hybrid port number 8:49 since that hybrid port number is associated with both of egress ports 8:21 and 8:22. As a result, twice as many packets will tend to be forwarded to I/O module 102b compared to I/O module 102c in accordance with the two-to-one ratio of potential egress ports associated with each respective module.

In contrast, for packets from host 202 on port 8:1 to host 206, it is preferred that only local ports on the same packet processor will be selected (i.e., 8:21 and 8:22). Accordingly, non-local ports (i.e., 9:23) are omitted from the supplementary entry of trunk table 120b. Similarly, it can be preferred that packets directed from host 204 on port 9:48 to host 206 will always egress the local port (i.e., 9:23). Only if port 9:23 were to go down would packets from host 204 to host 206 be distributed across ports 8:21 and 8:22 because no local ports remain active on that packet processor.

Figure 4:
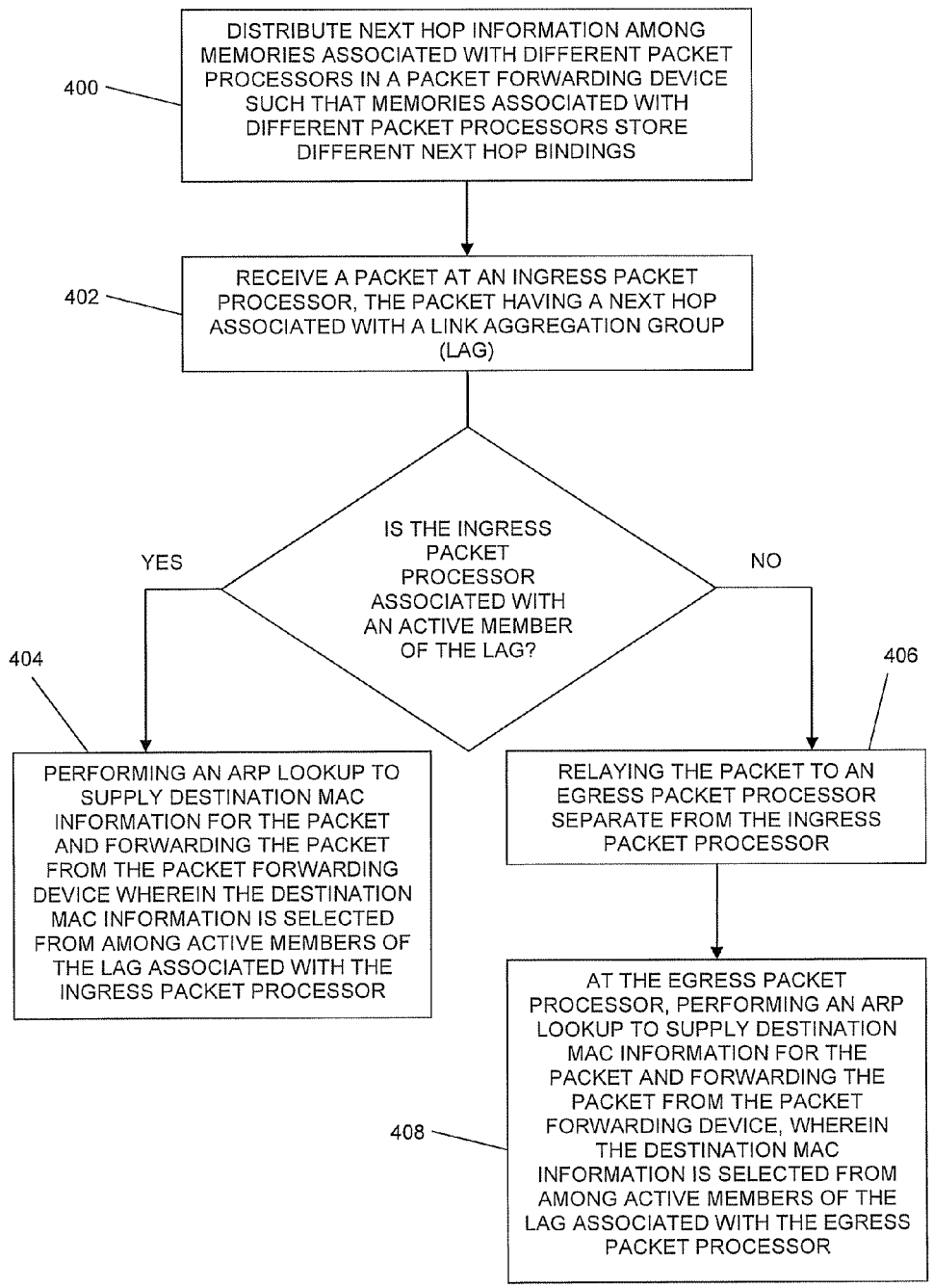
FIG. 4 is a flow chart illustrating an exemplary method for next hop scaling with link aggregation according to an embodiment of the subject matter described herein.

FIG. 4 is a flow chart illustrating an exemplary process for next hop scaling with link aggregation according to an embodiment of the subject matter described herein. Referring to FIG. 4, in step 400, next hop information is distributed among memories associated with different packet processors in a packet forwarding device such that memories associated with different packet processors store different next hop bindings. For example, as illustrated in FIG. 3, the next hop table associated with each packet processor (or the trunk table referenced by the packet processor) may store full MAC addresses for directly connected hosts and may store relay entries for hosts that are connected to other packet processors.

In step 402, a packet is received at an ingress packet processor. The packet has a next hop associated with a LAG. For example, referring again to FIG. 3, a packet received at slot1:port48 may have a destination IP address 23.1.1.89, which has a next hop which corresponds to the LAG connected to both of I/O modules 102b and 102c.

Returning to FIG. 4, in step 404, for an ingress packet processor associated with an active port member of the LAG, an ARP lookup is performed to determine the destination MAC address, and the packet is forwarded from the packet forwarding device. Specifically, the destination MAC address is selected from among members of the LAG associated with the ingress packet processor.

Returning to FIG. 4, in step 406, for an ingress packet processor that is not associated with an active port member of the LAG, the packet is first relayed to the egress packet processor. Continuing with the present example, for the packet addressed to 23.1.1.89 that arrives at slot1:port48, a LAG member selection operation will choose one of the hybrid port numbers listed in the supplementary entry to trunk table 120a and will be forwarded to either the slot8 packet processor or the slot9 packet processor based on this choice. The relayed packet will have a previously unused port number (i.e., a hybrid port) in its fabric header.

Returning to FIG. 4, in step 408, at the egress packet processor, the packet is received, the hybrid port address in the fabric header triggers an ARP lookup to determine the destination MAC address and the packet is forwarded from the packet forwarding device. Specifically, the destination MAC address is selected from among members of the LAG associated with the egress packet processor. Continuing the present example, if a packet addressed to 23.1.1.89 is forwarded to slot8, a second LAG member selection operation will choose from among slot8:port21 or slot8:port22 listed in the supplementary entry to trunk table 120b. The MAC address and VLAN tag in the packet will be replaced with the MAC address and VLAN tag corresponding to the chosen egress port. The packet will be forwarded from packet forwarding device 100 using the selected port.

Although the subject matter described above relates to distributed ARP scaling, the subject matter described herein is not limited to ARP scaling and can be applied to any type of next hop scaling without departing from the scope of the subject matter described herein. For example, the subject matter described herein can be used for distributed storage of neighbor discovery bindings (the ARP equivalent for IPv6) without departing from the scope of the subject matter described herein.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for next hop scaling with link aggregation, the system comprising:
   a packet forwarding device including:
      a plurality of packet processors for performing the next hop and link aggregation group (LAG) selection operations;
      wherein ingress packet processors of the plurality of packet processors are configured to perform a link aggregation group (LAG) member selection operation for packets that arrive from external ports of the packet forwarding device and are further configured to indicate, for received packets that have a next hop on a different packet processor, that an egress next hop selection operation is needed;
      wherein an egress packet processor of the plurality of packet processors is configured to, for the packets for which the egress next hop selection operation is indicated, perform the egress next hop and member selection operations and to limit forwarding of the packets to active LAG group members local to the egress packet processor;
      a memory associated with each of the plurality of packet processors stores relay entries for next hops connected to a remainder of the plurality of packet processors; and
      wherein the memory associated with each of the plurality of packet processors stores a single relay entry for each of the remainder of the plurality of packet processors.

2. The system of claim 1 wherein receipt of a packet that matched a relay entry on an ingress packet processor triggers an egress packet processor to perform an egress next hop lookup.

3. The system of claim 1 wherein the relay entries do not store MAC addresses for hosts connected to the remainder of the packet processors.

4. The system of claim 1 wherein a memory associated with each of the plurality of packet processors stores MAC addresses only for next hops that are directly connected thereto such that next hop bindings for hosts connected to the packet forwarding device are distributed among memories associated with all of the plurality of packet processors.

5. The system of claim 1 wherein each memory stores a layer 3 host or layer 3 longest prefix match route table that maps IP address information to next hop information and a next hop table that maps the next hop information to layer 2 packet forwarding information.

6. The system of claim 5 wherein an available memory for the layer 3 host or longest prefix match route table and the next hop table is shared.

7. The system of claim 6 wherein each memory stores a MAC forwarding database that stores MAC and VLAN information for hosts connected to the packet forwarding device.

8. The system of claim 1 wherein memories associated with the plurality of packet processors store next hop bindings for real and virtual hosts.

9. The system of claim 8 wherein the next hop bindings comprise address resolution protocol (ARP) bindings.

10. The system of claim 8 wherein the next hop bindings comprise IPv6 neighbor discovery bindings.

11. A method for next hop scaling, the method comprising:
   distributing next hop information among memories associated with different packet processors in a packet forwarding device including a plurality of packet processors such that the memories associated with the different packet processors store different next hop bindings;
   receiving a packet at an ingress packet processor, the packet having a next hop associated with a link aggregation group (LAG);
   performing a link aggregation group (LAG) member selection operation for packets that arrive from external ports of the packet forwarding device;
   for received packets that have a next hop on a different packet processor, indicating that an egress next hop selection operation is needed and relaying the packet to an egress packet processor;
   for the packets for which the egress next hop selection operation is indicated, performing the egress next hop and link aggregation group (LAG) member selection operations, wherein the link aggregation group (LAG) member selection operation limits forwarding of the packets to active members of the link aggregation group (LAG) that are local to the egress packet processor;
   a memory associated with each of the plurality of packet processors stores relay entries for next hops connected to a remainder of the plurality of packet processors; and
   wherein the memory associated with each of the plurality of packet processors stores a single relay entry for each of the remainder of the plurality of packet processors.

12. The method of claim 11 wherein receipt of a packet that matched a relay entry on the ingress packet processor triggers the egress packet processor to perform an egress next hop lookup.

13. The method of claim 11 wherein the relay entries do not store MAC addresses for hosts connected to the remainder of the packet processors.

14. The method of claim 11 wherein the memory associated with each of the plurality of packet processors stores MAC addresses only for next hops that are directly connected to each of the plurality of packet processors such that next hop bindings for hosts connected to the packet forwarding device are distributed among the memories associated with all of the plurality of packet processors.

15. The method of claim 11 wherein each memory stores a layer 3 host or longest prefix match route table that maps IP address information to next hop information and a next hop table that maps the next hop information to layer 2 packet forwarding information.

16. The method of claim 15 wherein an available memory for the layer 3 host or longest prefix match route table and the next hop table is shared.

17. The method of claim 16 wherein each of the memories stores a MAC forwarding database that stores MAC and VLAN information for hosts connected to the packet forwarding device.

18. The method of claim 11 wherein the next hop bindings comprise address resolution protocol (ARP) bindings.

19. The method of claim 11 wherein the next hop bindings comprise IPv6 neighbor discovery bindings.

20. A non-transitory computer readable medium having stored thereon executable instructions that when executed by a processor of a computer control the computer to perform steps comprising:

receiving a packet at an ingress packet processor of a packet forwarding device, the packet having a next hop associated with a link aggregation group (LAG);

performing a link aggregation group (LAG) member selection operation for packets that arrive from external ports of the packet forwarding device;

for received packets that have a next hop on a different packet processor, indicating that an egress next hop selection operation is needed and relaying the packet to an egress packet processor of the packet forwarding device;

for the packets for which the egress next hop selection operation is indicated, performing the egress next hop and link aggregation group (LAG) member selection operations, wherein the link aggregation group (LAG) member selection operation limits forwarding of the packets to active members of the link aggregation group (LAG) that are local to the egress packet processor;

a memory associated with each of the plurality of packet processors stores relay entries for next hops connected to a remainder of the plurality of packet processors; and wherein the memory associated with each of the plurality of packet processors stores a single relay entry for each of the remainder of the plurality of packet processors.

* * * * *